United States Patent
Brady et al.

(10) Patent No.: US 6,829,844 B2
(45) Date of Patent: Dec. 14, 2004

(54) EVAPORATIVE DESORPTION SOIL TREATMENT APPARATUS AND PROCESS

(76) Inventors: Patrick Richard Brady, 2124 Western Heights Loop NW., Salem, OR (US) 97304; John Lee Brady, 2599 Quail La., Los Osos, CA (US) 93402

(*) Notice: Subject to any disclaimer, the term of this patent is extended or adjusted under 35 U.S.C. 154(b) by 0 days.

(21) Appl. No.: 10/781,445

(22) Filed: Feb. 18, 2004

(65) Prior Publication Data

US 2004/0159004 A1 Aug. 19, 2004

Related U.S. Application Data

(63) Continuation of application No. 10/357,170, filed on Feb. 2, 2003, now abandoned, and a continuation of application No. PCT/US03/03560, filed on Feb. 5, 2003.
(60) Provisional application No. 60/354,572, filed on Feb. 6, 2002.

(51) Int. Cl.[7] .................................................. F26B 7/00
(52) U.S. Cl. .............................. 34/381; 34/417; 34/519; 34/62; 34/235; 34/236
(58) Field of Search .......................... 34/380, 381, 390, 34/417, 499, 519, 60, 61, 62, 210, 235, 236; 405/128.9, 128.7; 110/233, 236; 422/117, 112

(56) References Cited

U.S. PATENT DOCUMENTS

| | | |
|---|---|---|
| 4,738,206 A | 4/1988 | Noland |
| 4,864,942 A | 9/1989 | Fochtman et al. |
| 4,977,839 A | 12/1990 | Fochtman et al. |
| 5,067,852 A | 11/1991 | Plunkett |
| 5,098,481 A | 3/1992 | Monlux |
| 5,213,445 A | 5/1993 | Ikenberry et al. |
| 5,228,804 A | 7/1993 | Balch |
| 5,230,167 A * | 7/1993 | Lahoda et al. ............... 34/75 |
| 5,302,118 A | 4/1994 | Renegar et al. |
| 5,361,514 A * | 11/1994 | Lahoda et al. ............. 34/391 |
| 5,836,718 A | 11/1998 | Price |
| RE36,222 E | 6/1999 | O'Ham |
| 6,000,882 A | 12/1999 | Bova et al. |
| 6,110,430 A * | 8/2000 | Swisher et al. ........... 422/173 |
| 6,146,596 A * | 11/2000 | Hill et al. ................. 422/117 |
| 6,296,815 B1 | 10/2001 | Walker et al. |

FOREIGN PATENT DOCUMENTS

EP 0 546 649 * 6/1993 ............. B09B/3/00

* cited by examiner

Primary Examiner—Stephen Gravini
(74) Attorney, Agent, or Firm—William Keyworth; Bill & Mary Lou Inc

(57) ABSTRACT

Treatment apparatus and a process for thermal desorption of hydrocarbon contaminants from excavated soil provides efficient contaminant removal by handling the soil in a thermally conductive treatment vessel that fits within an insulated treatment chamber. The soil is treated in this chamber with fresh air that is dried and electrically heated prior to contacting the treatment vessel. The dry air passes through the soil and the air mixed with contaminants is withdrawn from the chamber through piping in the treatment vessel. Excavating the soil directly into the treatment vessel allows the treated soil to be returned to the final disposition site in the same vessel, minimizing soil handling.

8 Claims, 8 Drawing Sheets

EVAPORATIVE DESORPTION SOIL TREATMENT APPARATUS AND PROCESS

CROSS-REFERENCE TO RELATED APPLICATIONS

This application claims priority from Provisional Patent Application 60/354,572, "Evaporative Desorption Soil Treatment Apparatus and Process" filed on Feb. 6, 2002.

This application is a continuation of pending U.S. Nonprovisional patent application Ser. No. 10/357,170, "Evaporative Desorption Soil Treatment Apparatus and Process" filed on Feb. 2, 2003, now abandoned.

This application is a continuation of PCT application PCT/US03/03560 (WO 03/066249), "Evaporative Desorption Soil Treatment Apparatus and Process" filed on Feb. 5, 2003.

STATEMENT REGARDING FEDERALLY SPONSORED RESEARCH AND DEVELOPMENT

Not Applicable.

REFERENCE TO A MICROFICHE APPENDIX

Not Applicable.

BACKGROUND OF THE INVENTION

1. Field of the Invention

This invention relates to a process and apparatus for thermal desorption of contaminates from a mixture of soil and rocks using desiccated, electrically-heated fresh air to treat the soil and rocks which have been excavated and placed in a thermally conductive treatment container which is then placed in a thermally insulated treatment chamber. The fresh, hot, desiccated air is drawn through the soil treatment container, cooled, and released; or discharged to a treatment system, as required or needed, prior to release to the atmosphere.

2. Description of Related Art

The use of petroleum hydrocarbons as a fuel source is ubiquitous in society. Consequently, petroleum hydrocarbon products are stored and handled in great quantities. One risk associated with the storage and handling of petroleum hydrocarbons is the potential for spillages during handling or the potential for leakage during storage. Due to the negative environmental impact associated with spills and leakages of petroleum hydrocarbons, rules have been established at the local, state and federal levels. These rules primarily focus on preventing petroleum hydrocarbon releases to the environment from occurring. These rules also have provisions that require the responsible party to remediate petroleum hydrocarbon releases to the environment.

In the field of petroleum hydrocarbon remediation from soil, there are two basic approaches: applying a treatment technique to soil in place (in-situ), or applying a treatment technique to excavated soil (ex-situ). There are advantages and disadvantages for each approach and the selection of the approach is based on the site-specific circumstances of each petroleum hydrocarbon release. The present invention deals with an ex-situ remediation technique. Using this invention, soil that is contaminated with petroleum hydrocarbons will require excavation prior to treatment.

There are numerous ex-situ treatment techniques available. The present invention may be categorized as a thermal desorption technology. Another treatment type available may be characterized as liquid solvent, where a liquid is used as the treatment medium and is introduced to the soil and then removed, taking contaminates with it.

Prior art for ex-situ thermal desorption technologies reveal that there are two basic categories of thermal desorption techniques: (1) techniques that involve mechanical agitation of the soil during the heating process and (2) techniques that are applied to a static configuration of soil.

Often the techniques that involve mechanical agitation also operate in a continuous process where the soil is continuously introduced to the process and is mechanically moved through the process apparatus until treatment is complete, and then is continuously discharged to a container for disposal or re-use.

Alternately, techniques that are applied to a static configuration of soil are generally treated in batches where a batch or given amount of soil is introduced to the treatment apparatus; the treatment process is started, and when complete, is stopped and the treated soil removed. The next batch of soil is then introduced to the treatment apparatus. Static configuration techniques may also be broken down into two subcategories: (a) pile arrangement and (b) container arrangements.

Another characteristic of thermal desorption technologies is the source of heat and the gas used to effect the decontamination. The exact mechanism that occurs in thermal desorption is not well understood and a variety of techniques have been proposed in the prior art. Some processes use combustion gases from the burning of a fossil fuel as both the source of heat and the desorption gas. Sometimes the fuel is supplemented by recirculating the contaminated off-gas from the treated soil to the burn chamber as additional fuel. Other processes have used fresh air, or an inert gas, as the treatment gas, and heat the treatment gas indirectly in a heat exchanger prior to introducing it to the soil, or heat the soil and not the treatment gas.

Nearly all the prior art processes use combustion of fossil fuel as a heat source. This has the undesirable consequence of forming products of incomplete combustion, oxides of nitrogen, and other greenhouse gases as a by-product. Combustion also has the potential to add unburned hydrocarbons to the process exhaust gas if strict control of the combustion process is not maintained.

A variety of temperatures have been used for the treatment gas and in control of the off-gas temperature, which is indicative of the soil temperature. The temperature and time at temperature may be varied depending on the characteristics of the soil and its' contaminates.

The prior art contains a variety of processes making use of all the above variables. U.S. Pat. No. 4,738,206 (Noland), U.S. Pat. No. 4,864,942 (Fochtman) and U.S. Pat. No. 4,977,839 (Fochtman) describe continuous process apparatus that make use of combustion gases for heat. These processes vary greatly in the temperatures used with U.S. Pat. No. 4,738,206 teaching a range of 120 to 450 degrees F. and U.S. Pat. Nos. 4,864,942 and 4,977,839 claiming a range of 300 to 400 degrees C. (which is 572 to 752 degrees F.) They also vary in the treatment gas with U.S. Pat. No. 4,738,206 using combustion gas and U.S. Pat. Nos. 4,864, 942 and 4,977,839 teaching the use of an inert gas such as nitrogen, and the addition of water.

A characteristic of these continuous processes is the use of heavy material handling equipment that uses large amounts of energy in moving the material through the treatment process. This energy use is in addition to that expended in treating and in excavating the material and returning it to its final state.

Static processes that use a pile arrangement are described in U.S. Pat. No. 5,067,852 (Plunkett), U.S. Pat. No. 5,213,445 (Ikenberry), U.S. Pat. No. 5,228,804 (Balch), U.S. Pat. No. 5,836,718 (Price), and U.S. Pat. No. 6,000,882 (Bova). The apparatus of each of these consists of soil that is placed on a treatment surface then layered with differing configurations of piping until the desired configuration is attained. The pile is then covered with a vapor-proof covering prior to treatment. These processes also vary greatly in the temperature used. U.S. Pat. No. 5,067,852 uses unheated air as the treatment gas, but teaches that some heat is advantageous. At the other end of the temperature range U.S. Pat. No. 5,228,804 teaches the use of air heated in a heat exchanger to 1200 to 1400 degrees F. as a treatment gas. More moderate treatment gas temperatures, to 300 degrees F., are used in U.S. Pat. No. 5,213,445 using a treatment gas of combustion products from recirculating the off-gas, while U.S. Pat. No. 6,000,882 injects combustion gas of at least 800 degrees F. and perhaps as high as 2500 degrees F. to raise the soil temperature to the 212 to 350 degree F. range, then exhausts the off-gas through the same piping. Another approach is taken by U.S. Pat. No. 5,836,718 in that the soil is heated by conduction through the walls of the piping in the soil pile to a temperature of 90 to 250 degree C. (194 to 452 degree F.) and the fresh air treatment gas is not heated.

The pile arrangement processes do not require energy-intensive material handling during treatment, however they may be characterized as requiring labor-intensive setup and disassembly in the activity of layering the piping system within the soil pile and removing it following treatment, and also in covering and uncovering the completed pile.

Static processes that use a container arrangement are not as prevalent in the prior art. One example is U.S. Pat. Reissue No. 36,222 (O'Ham) that has the contaminated soil loaded into a tray-shaped treatment container, and then directs combustion heat and gases on the surface of the soil while the off-gas is removed from the bottom of the container. Temperatures are not given, but the inlet gas temperature may be assumed to be in the upper end of the treatment range. U.S. Pat. No. 6,296,815 (Walker) takes another approach. The soil is loaded into tall-insulated containers and then electric resistance heaters are inserted into the soil. The containers are moved into an insulated treatment vessel and the soil heated directly. The details of the process are not given.

The advantages of a static process using a container is the container can provide for ease of loading and unloading material, reducing labor when compared with pile arrangements, and it does not require high energy costs for material handling when compared with continuous processing arrangements. A disadvantage of these prior-art container arrangements is they require handling the soil to move it from the container in which it was placed after excavation, which presumably would be a dump truck hopper, load it into the treatment container for treatment, and then handle it again following treatment to put it back into the dump truck hopper disposition.

The review of the prior art summarized above indicates a need for an ex-situ static process that is labor efficient by requiring only a single soil handling step during excavation and then maintains the soil in the same container until it is returned to the site of disposition, is time and energy efficient in the treatment process, and is environmentally friendly by avoiding combustion in the treatment process and by using air temperatures below those conducive to forming oxides of nitrogen.

SUMMARY OF THE INVENTION

The present invention can be categorized as a thermal desorption technique applied to a static configuration of soil in a batch process using a container arrangement. The process is designed to use temperatures based on testing of samples of the contaminated soil to be treated. Contaminates may vary widely and therefore the temperatures used will vary to obtain an efficient remediation process for the contaminate of interest.

The treatment process for thermal desorption of hydrocarbon contaminants from excavated soil provides efficient contaminant removal by handling the soil in a thermally conductive treatment vessel that is contained in an insulated treatment chamber for treatment. The soil is treated with fresh air that is dried and electrically heated prior to introduction to the treatment chamber. Excavating the soil directly into the treatment vessel allows the treated soil to be returned to the final disposition site in the same vessel, minimizing soil handling The treatment vessel consists of a floor, sides and ends to contain contaminated soil that remains exposed at the top of the vessel, and a gas exit pathway arranged at a predetermined location within the contaminated soil such that gases in the contaminated soil flow to the gas exit pathway.

The treatment chamber has an opening so the treatment vessel may be inserted or removed, an incoming air penetration to direct the incoming air to locations external to the treatment vessel and a gas exit pathway penetration arranged so the gases in the pathway exit the treatment chamber.

An air dryer, air blower and electric air heater are arranged such that the incoming air to the treatment chamber is dried and heated upon entering the treatment chamber.

A gas extraction blower directs the gases in the gas exit pathway penetration to exit the treatment chamber. This air is cooled prior to flowing through the blower.

The process flow path then is for dry, heated incoming air to surround the treatment vessel transferring heat to the contaminated soil through the treatment vessel floor, sides, and ends inducing the migration of contaminates through the soil to the gas exit pathway, and then the heated air then flows through the contaminated soil, directly heating the soil before entering the gas exit pathway and exiting the chamber.

OBJECTS AND ADVANTAGES

One object of this invention is to provide a thermal desorption technique which uses a non-combustive heat source. This eliminates the formation of oxides of nitrogen due to combustion and the potential for addition of incomplete combustion products to the process exhaust.

A second object of this invention is to provide a treatment that controls the maximum temperature of the air, thereby maintaining temperatures below those conducive to formation of oxides of nitrogen.

A third object of this invention is to use dry air as the treatment gas. This increases the efficiency of heat delivery by eliminating the latent heat of vaporization of entrained moisture and improves the efficiency of hydrocarbon and water removal from the treated soil.

A fourth object of this invention is to provide efficient heat transfer to the soil. This reduces the energy required to treat a batch of soil.

A fifth object of this invention is to provide uniform heating of the soil so as to assure that all the soil receives a thorough treatment.

A sixth object of this invention is to provide a soil treatment container in which the soil may be inserted into as it is excavated, and therefore does not require further handling of the soil until treatment is complete and it is being placed in its final disposition location.

A seventh object of this invention is to provide a soil treatment process which is conducted in batches that allows adjusting the treatment parameters (time, temperature) for the specific soil and contaminates encountered at the treatment location.

BRIEF DESCRIPTION OF THE SEVERAL VIEWS OF THE DRAWINGS

A more complete understanding of the present invention can be obtained by considering the detailed description in conjunction with the accompanying drawings, in which.

REFERENCE NUMERALS IN DRAWINGS

Figure 1:
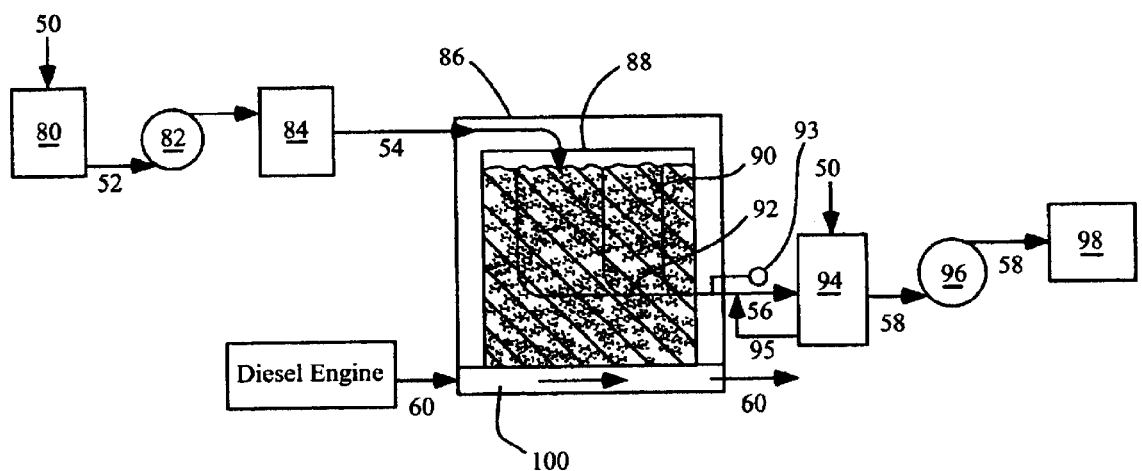
FIG. 1 is a diagram of the process also showing the operation of the treatment chamber.

These reference numbers are used in the drawing to refer to areas or features of the invention.

Figure 2:
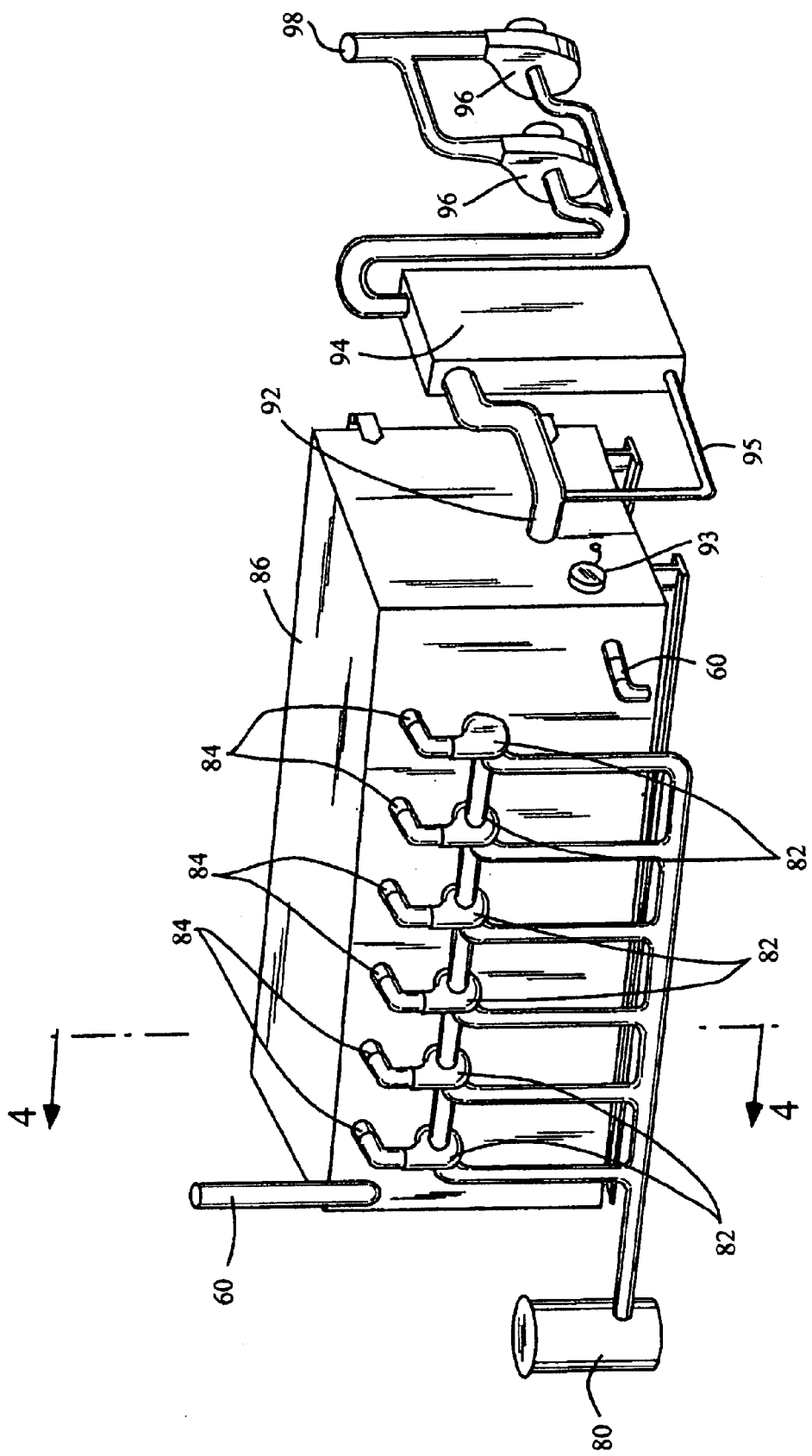
FIG. 2 is a perspective view showing the arrangement of the treatment chamber from the hot gas inlet side of the chamber. In this figure the treatment vessel is shown with a connection for the generator exhaust heat exchanger. The exhaust cooling system, gas extraction blower, and discharge pipe to an off-gas treatment system, if used, is shown.
Figure 3:
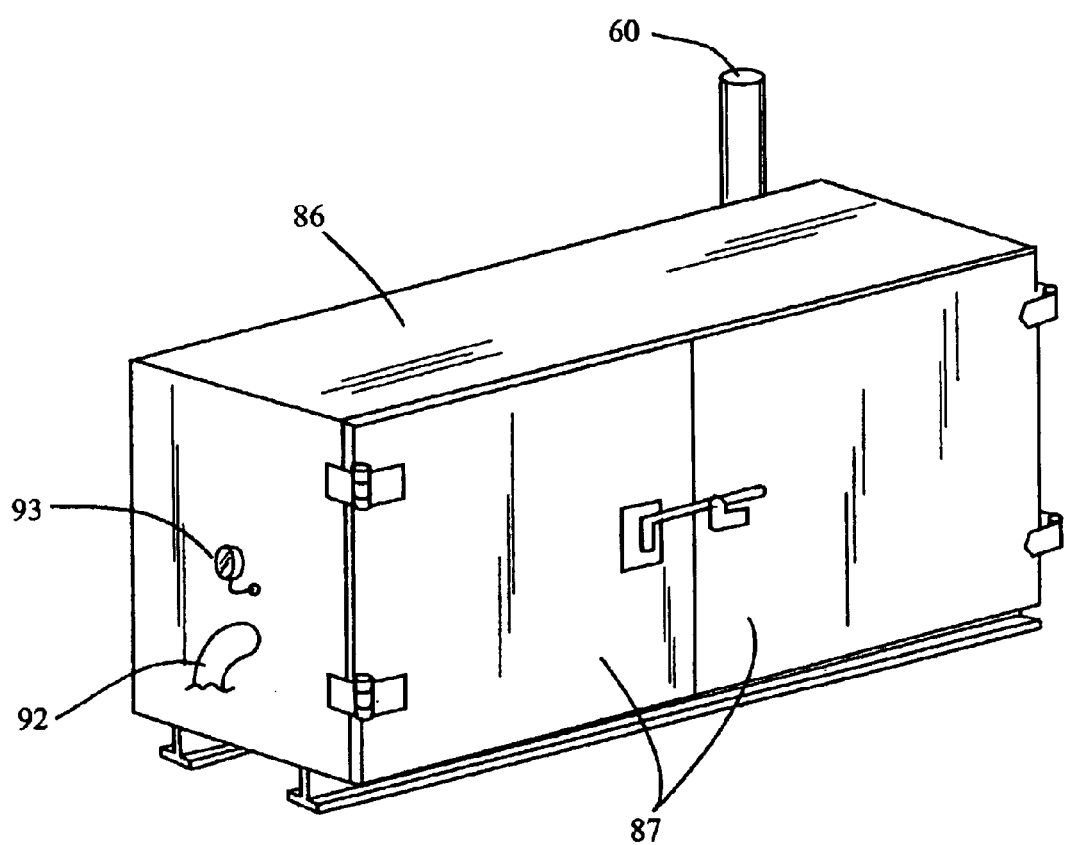
FIG. 3 is a perspective view showing the arrangement of the treatment chamber from the chamber closure side of the chamber. In this figure the exhaust cooling system cooler and the gas extraction blowers that are shown in FIG. 2 are not shown.
Figure 4:
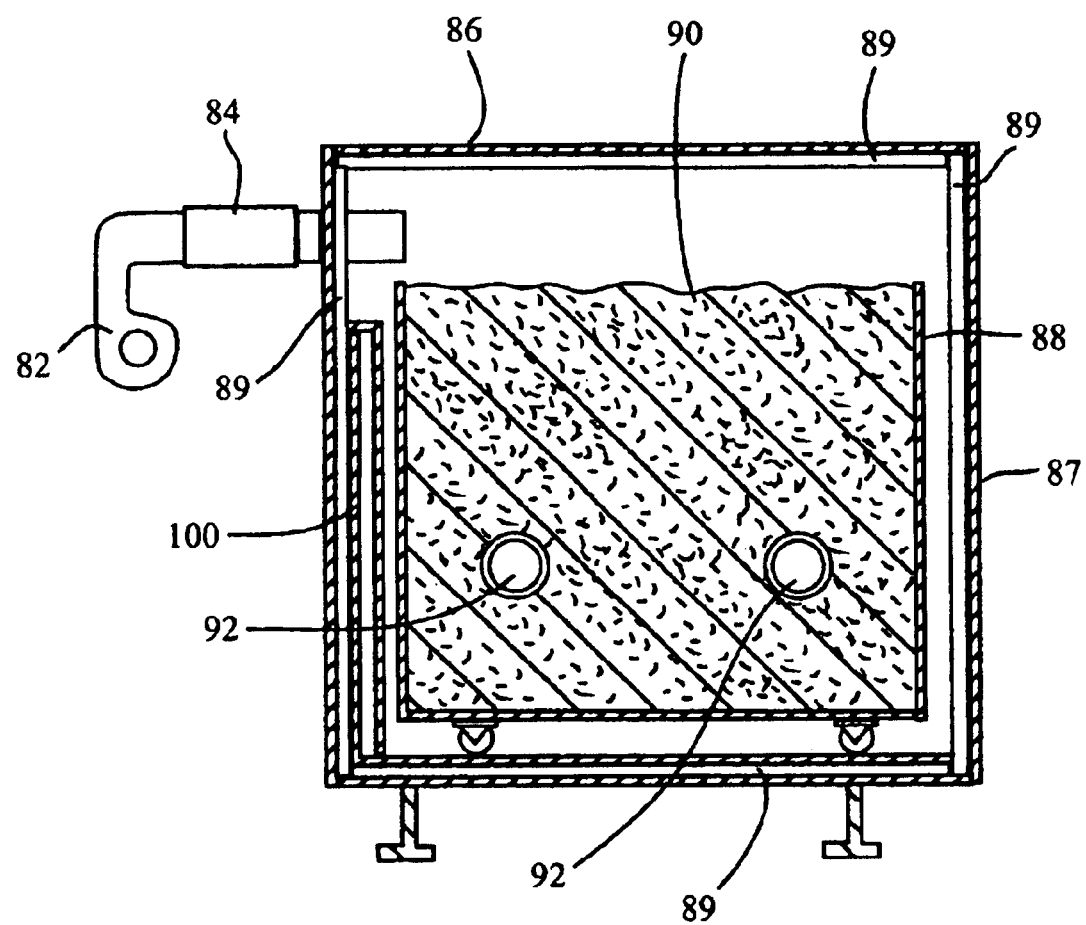
FIG. 4 is a perspective cross sectional view of the treatment chamber in the section 4—4 as shown in FIG. 2 to show the arrangement of the treatment vessel in the treatment chamber. In this figure the treatment chamber is shown with a generator exhaust heat exchanger.

Process Conditions
50 Fresh Air
52 Fresh Dry Air
54 Dry, Hot Heated Air
56 Hot Heated Air and Volatile Contaminants
58 Warm Heated Air and Volatile Contaminants
60 Generator Exhaust Apparatus
80 Air Dryer
82 Heater Blower
84 Electric Air Heater
86 Insulated Treatment Chamber
87 Insulated Treatment Chamber Closure
88 Thermal Conductive Treatment Vessel
89 Insulation
90 Contaminated Soil
92 Gas Exit Pathway
93 Gas temperature measurement
94 Exhaust Cooling System Cooler
95 Exhaust Cooling System Water-Injection Pipe
96 Gas Extraction Blower
98 Off-Gas Processing
99 Refrigeration System
100 Generator Exhaust Heat Exchanger DETALED DESCRIPTION OF THE INVENTION
Preferred Embodiment FIGS. 1 through 7 show the preferred embodiment of the evaporative desorption soil treatment process apparatus. FIG. 1 shows the treatment process method and FIGS. 2 through 7 show the arrangement of the apparatus. Treatment is done in a metal treatment chamber with internal thermal insulation as shown in FIG. 4. This figure shows the contaminated soil (90) that was dug from the contamination site, located in the open-top thermal conductive treatment vessel (88), which in turn is located in the treatment chamber (86). The soil is generally a mixture of soil and rocks. The contaminates in the soil and their concentrations may vary depending on the location they are dug from at the contaminated site.

Figure 5:
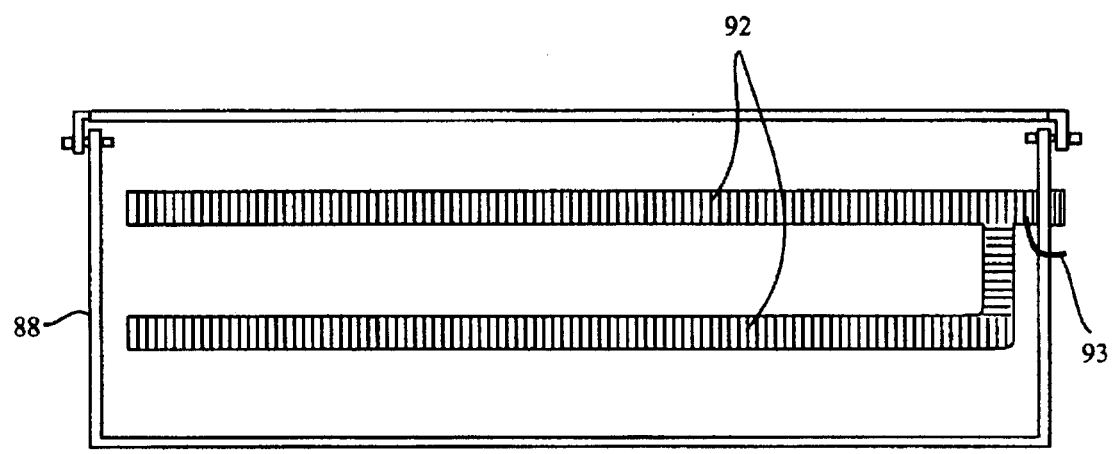
FIG. 5 shows a top view of an empty treatment vessel showing the arrangement of the gas exit pathway.
Figure 6:
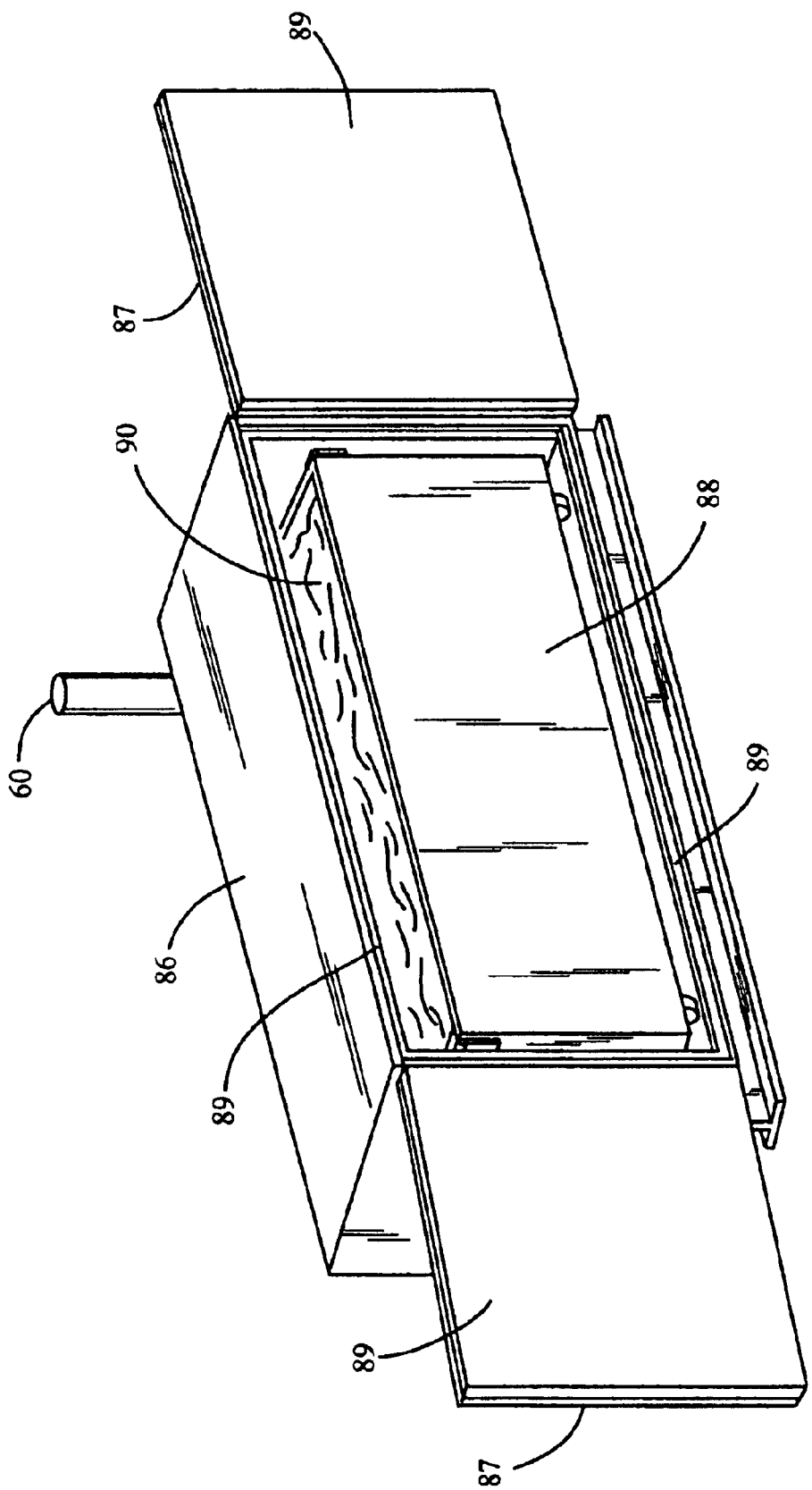
FIG. 6 is a perspective view showing the arrangement of the treatment chamber from the chamber closure side of the chamber. In this figure the chamber closures are open showing the treatment vessel, a roll-off bin, inside the chamber.
Figure 7:
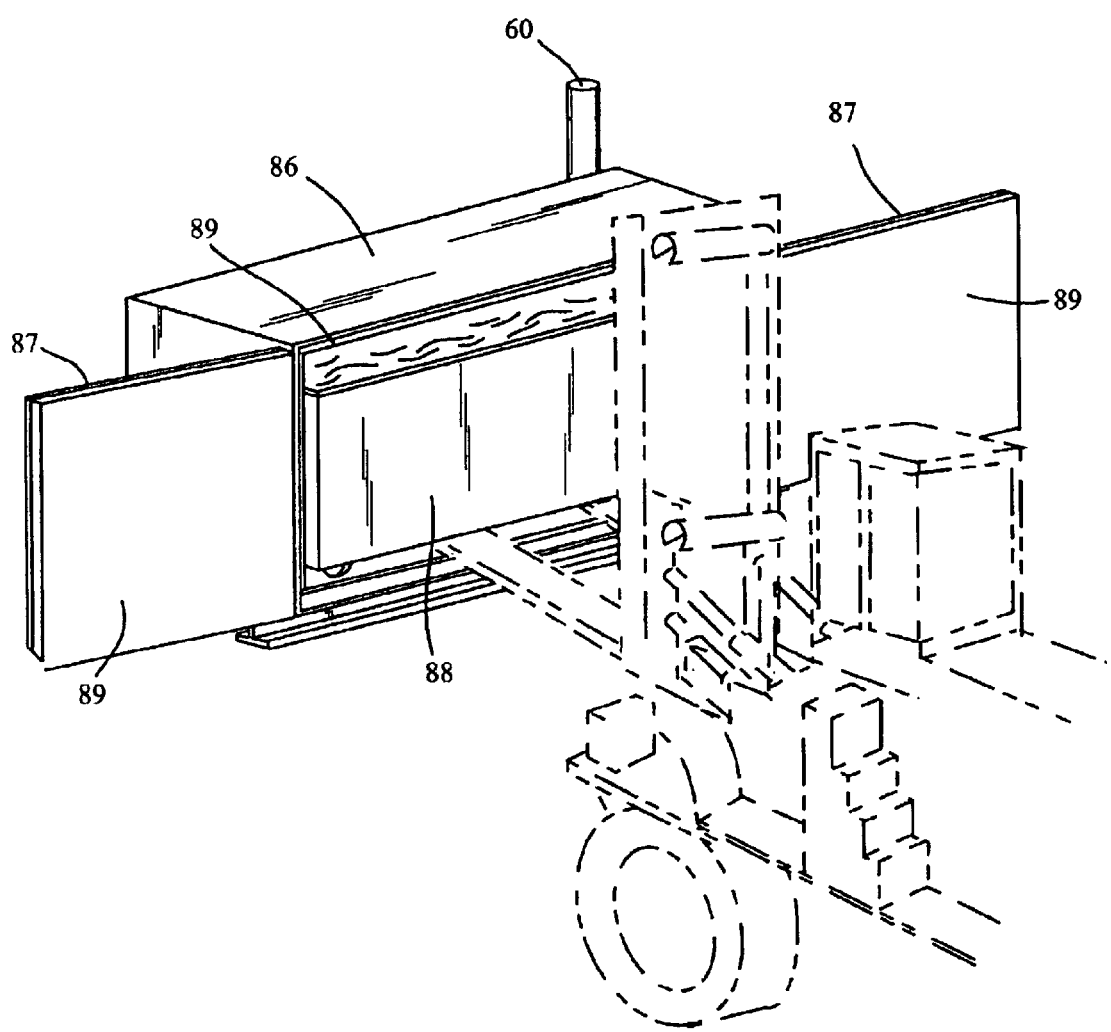
FIG. 7 is a perspective showing the arrangement of the treatment chamber from the chamber closure side of the chamber. In this figure the chamber closures are open showing a treatment vessel being loaded or removed from the chamber by a forklift.

The treatment vessel is a removable, sometimes called a roll-off, hopper modified to contain the gas exit pathway (92). FIG. 5 shows this pathway (92) is a slotted or perforated piping array located near the centerline of the treatment vessel at an elevation from the floor and distance from the sides that balances soil heating by conduction through the vessel wall and floor and forced convection of the treatment gas through the soil. The piping used for the preferred embodiment is a double-wall-continuous-slot well screen, sometimes called wire-wrapped screen. This provides for good gas flow with minimal ingress of soil to the pathway. The open-top treatment vessel (88) is supported by its rollers or steel rails in the bottom of the insulated treatment chamber. FIG. 6 shows that one end of the treatment chamber (86) contains an opening that allows one or more treatment vessels (88), to be inserted and removed from the treatment chamber. Treatment vessels are approximately 5 feet high, 5 feet wide, and up to 20 feet long, but may be as small as 8 feet long, in which case the treatment chamber is configured to hold two or more of them. The treatment vessel is inserted into the housing treatment chamber and removed by rolling or sliding the vessel via forklift or modified loader. FIG. 7 illustrates this process with a single treatment chamber. A forklift or modified loader is used to transport the treatment vessel and the soil contained in it to and from the treatment chamber location. The contaminated soil, once loaded in the treatment vessel at the contamination site, is not removed from the treatment vessel until treatment is complete and it is ready to be returned to the soil disposition site.

In the preferred embodiment, the power to operate the treatment air process equipment is supplied by an adjacent diesel generator which has the engine exhaust flowing through a heat exchanger (100) built into the interior of the treatment chamber as shown in FIG. 4. The penetrations for the exhaust to enter the chamber and exhaust from the chamber (60) are shown in FIGS. 1 and 2. The heat exchanger adds heat to the treatment chamber that further improves the efficiency of the treatment process.

The insulated treatment chamber (86) opening has an insulated closure (87) that seals the opening against leakage during the treatment process. FIG. 3 shows the closure in the closed position and FIG. 6 shows the closure in the open position. FIG. 2 shows the opposite side of the chamber has penetrations for the discharge from the multiple heater blowers (82) and multiple electric air heaters (84). The end of the chamber shown has the gas exit pathway (92) penetration. This latter connection provides a flow path from the gas exit pathway in the treatment vessel to the exterior of the treatment chamber and from there to the air cooling system (94), the gas extraction blowers (96) and then the gases are either exhausted to the atmosphere, or further treated (98) if necessary. The extracted vapors may also be treated (98) in the hot condition prior to exiting the treatment chamber by using, for example, a catalyst to reduce contaminates in the flow path just prior to the gas exit pathway penetration. The entire treatment chamber is insulated (89) on the inside as shown in FIGS. 4 and 6.

Once the contaminated soil treatment vessel is in place, connected, and the treatment vessel closure is latched, the processing can start. The process flow, as shown on FIG. 1, begins with fresh air (50) drawn through a desiccant container (80) by the heater blower (82) to provide fresh dry air (52). Any of a variety of commercially available air-drying desiccants may be used in the containers through which the fresh air is drawn. This fresh dry air flows through the electric air heaters (84) and into the insulated treatment chamber (86). The dry, hot air (54) entering the chamber flows around the thermal conductive treatment vessel (88), heating the vessel and the soil (90) within by conduction through the vessel floor, sides, and ends. It flows to the soil exposed in the top of the treatment vessel, then flows through the soil, transferring heat by direct contact, and acquiring (desorbing) volatile contaminants as it travels through the soil to the slotted or perforated piping gas exit pathway (90) in the lower part of the treatment vessel. The combination of heat conduction through the walls and floor of the treatment vessel and heat convection from the flow of hot, dry air down through the soil tends to heat the soil evenly, treating it uniformly. The hot air containing volatile contaminants (56) then flows out the gas exit pathway (92) penetration to exit the treatment chamber. The exhaust gas is cooled in the exhaust cooling system cooler (94), prior to being drawn into the gas extraction blowers (96). If required by a particular site, a vapor treatment system (98) instead of being downstream of the gas extraction blowers, as shown on FIGS. 1 and 2, may be located inside the treatment chamber to provide treatment of the heated gas prior to exiting the chamber.

Temperature of the exhaust gas is measured (93) at the gas exit pathway penetration as a process control. If an internal vapor treatment system is used, the temperature is measured before passage through the vapor treatment system. The temperature required to remove contaminates is dependant on the contaminate and the type of soil involved and is therefore determined on a case-by-case basis for each site. Alternately, the exhaust gas may be sampled for the contaminate of interest to determine the state of decontamination of the soil being treated. Other process controls are also used as required by the specific equipment selected for use in the apparatus.

The exiting exhaust gas (56), consisting of contaminates and hot air, are cooled by the exhaust cooling system cooler (94) and water injection pipe (95). The exiting gases are under a vacuum caused by the gas extraction blower. In the preferred embodiment, as shown in FIG. 2, the exhaust cooler contains room for water storage in the lower portion of the cooler. The water is sufficiently deep that it provides sufficient gravity head to overcome the gas pressure drop from the gas exit pathway penetration to the gas extraction blower suction. This causes the water to flow from the cooler, through the water-injection pipe, to the exit penetration of the gas exit pathway, where it mixes with the flow of hot gases. In the hot gases, the water cools the hot gases by vaporizing as the gas and water mixture flows to the cooler. In the cooler, water that is has not yet vaporized, being heavier than the gases, returns to the lower portion of the cooler. The cooled gases (58) are drawn from the upper portion of the cooler into the gas extraction blower (96). With this arrangement, the gas extraction blower does not have to handle hot gases, extending the life of the blower. The water in the cooler is periodically refilled between the treatments of soil batches to make up for the vaporization losses.

The pressurized warm air and volatile contaminants (58) then are discharged to atmosphere, or flow to off-gas processing (98) for removal of contaminates. This will vary depending on the type of contaminants and air quality needs of the local area. Such a treatment system may be an activated charcoal bed, or other system as required by the treatment site characteristics.

Additional Embodiments

The capacity of the insulated treatment chamber and thermal conductive treatment vessel may be varied to accommodate the reclamation project needs. Changes in the capacity of the treatment air process equipment will be necessary with significant changes in the capacity.

The gas exit pathway in the treatment vessel may be constructed of a wide variety of perforated or slotted piping or well screen.

Remediation sites with access to electrical power may not require the use of a generator to power the treatment air process equipment, or some sites may use a power source remote from the treatment chamber location, or use a power source other than a diesel engine. The treatment chamber will not require the generator exhaust heat exchanger under these conditions. Alternately, a small combustion turbine generator may be used and its exhaust directed through the heat exchanger.

The exhaust cooling system cooler may provide cooling of the contaminated hot air exiting the treatment chamber by employing injection of cool air rather than using the water injection. This adds volume to the amount of exhaust gas to be processed, requiring a larger gas extraction blower and increased off-gas processing capacity, if a post-exhaust off-gas processing system is used.

The exhaust cooling system may have water-injection provided from a separate, atmospheric pressure, water tank, or source of pressurized water. If this method is used, the water is drawn through the water-injection pipe, to the exit penetration of the gas exit pathway by the vacuum in the gas exit pathway during operation of the gas extraction blower. The cooler still requires a reservoir for water that has not vaporized and will require periodic draining between soil treatments.

Figure 8:
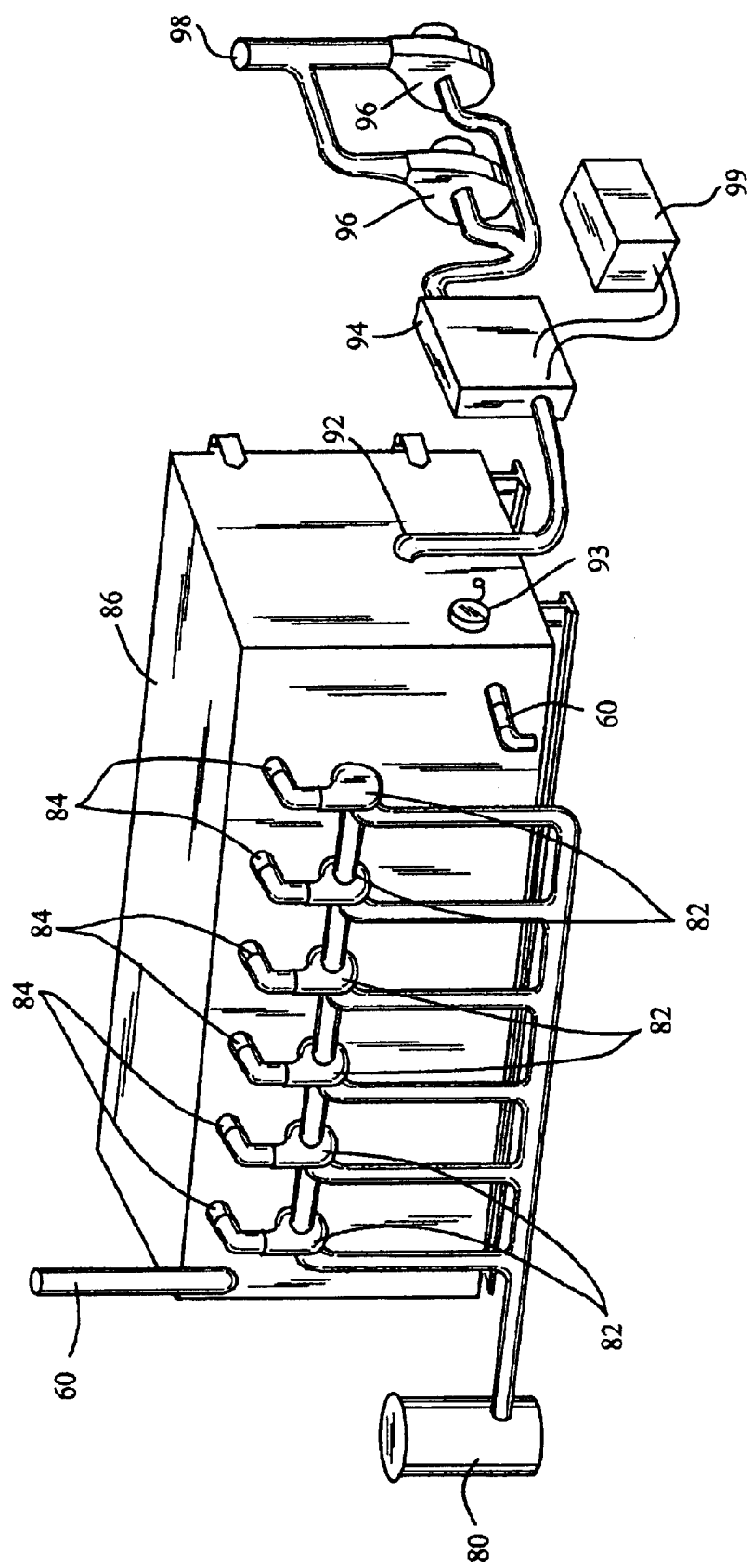
FIG. 8 is a perspective view showing the arrangement of the treatment chamber from the hot gas inlet side of the chamber. In this figure the exhaust cooling system cooler is an embodiment where the cooler is connected to a common refrigeration system employing a refrigerant to cool the exhaust gases.

The exhaust cooling system cooler may provide cooling of the contaminated hot air exiting the treatment chamber by employing a heat exchanger rather than using a water injection system. This adds components to the treatment process, and requires a continuous flow of coolant during treatment of a batch of contaminated soil, increasing costs. The coolant may also be a refrigeration system, as shown in FIG. 8. This system uses the heat exchanger as the refrigeration cycle evaporator. This has the advantage of chilling the exhaust gases to a cold enough temperature, such as near or below freezing, that some contaminants, for example, polychlorinated biphenyls (PCBs), can be condensed in the cooler. The refrigeration cycle is typically a compressor taking suction from the discharge of the evaporator. The compressor discharge flows to a condenser where the pressurized, hot refrigerant is cooled. The pressurized, cool refrigerant is then depressurized by flowing through a restricted flow area on entry into the evaporator where it is available to absorb heat and then continue the cycle.

The off-gas processing may be in one or more alternate locations in the exhaust gas flow path as required for the site being treated. Examples of alternate locations would be inside the treatment vessel, or at the inlet to the gas extraction blower. Treatment systems with these locations could be, but are not limited to, catalytic oxidizers in the treatment chamber, or a vapor condenser at the gas extraction blower inlet.

Operation

The evaporative desorption soil treatment unit may be transported to the site of the soil contamination where the treatment chamber is installed in a location convenient to the excavation site. The desiccant air dryers (80) are piped to the suction of the heater blower (82) and the discharge of the heater blower is piped to the electric air heater (84) inlets. The gas exit pathway piping is connected to the air-cooling system cooler (94), and to the gas extraction blowers (96) suction and the off-gas processing system (98). A diesel generator is installed adjacent to the treatment chamber and it provides power to the blowers (82, 96), the air heaters (84), the process monitoring instrumentation, and the exhaust cooling and off-gas processing systems as needed to ready them for service.

Soil is excavated at the location of the contamination and placed into the removable treatment vessels, which have been modified to have slotted or perforated pipe gas exit pathways (92). The chamber is opened and the contaminated soil-containing treatment vessel is slid into the treatment chamber. The gas exit pathway piping is connected to the treatment vessel and the treatment chamber opening is closed and sealed. The chamber is now ready to treat the contaminated soil.

The soil treatment is started by establishing air flow through the treatment chamber. The heater and gas extraction blowers are turned on to establish the airflow. The air flows through the desiccant air dryer (80) into the heater blower (82) and then through the air heaters (84) into the treatment chamber (86). The air passes through the soil (90) in the treatment vessel (88), into the gas exit pathway (92), and then to the penetration of the treatment chamber, where its temperature is measured (93). It then passes to the exhaust cooling system cooler (94) before entering the gas extraction blower (96) and flowing to the off-gas processing, (98), if provided. When adequate airflow is established, the electric air heaters (84) may be started and this will heat the fresh dry air incoming to the chamber (54). As the air leaving the chamber (56) warms up during the treatment, the exhaust cooling system (94) may need to be adjusted to maintain the airflow through the gas extraction blower (96) at the desired temperature. When the air leaving the treatment chamber (56) has reached the desired temperature, the soil treatment is done and the heaters (82) are turned off. The blowers may then be stopped. The treatment chamber is then opened and the treatment vessel of treated soil removed via forklift or modified loader. Another treatment vessel of contaminated soil may then be loaded into the treatment chamber and the process repeated.

We claim:

1. A method for thermal desorption of contaminates in soil comprising:
   a. excavating the contaminated soil;
   b. placing the contaminated soil in a thermally conductive treatment vessel containing a gas exit pathway;
   c. transporting the treatment vessel to an insulated treatment chamber:
   d. installing the treatment vessel in the treatment chamber;
   e. inducing flow of air through an air dryer;
   f. inducing flow of the dried air through an air heater;
   g. heating the dried air;
   h. inducing flow of the dried and heated air into the treatment chamber to contact the treatment vessel and flow through the contaminated soil to the gas exit pathway;
   i. exhausting heated air and contaminates from the gas exit pathway;
   j. stopping flow of the dried and heated air when the soil is decontaminated;
   k. removing the treatment vessel from the treatment chamber;
   l. transporting the treatment vessel to the soil disposition site; and
   m. transferring the soil from the treatment vessel to the disposition site.

2. The method for thermal desorption of contaminates in soil in claim 1 further comprising cooling the air exhausted from the gas exit pathway.

3. An apparatus for thermal desorption of contaminates from a mixture of soil and rocks comprising:
   a. a treatment vessel consisting of a floor with an inner side and outer side, a first side with an inner side and outer side, a second side with an inner side and outer side, a first end with an inner side and outer side, and a second end with an inner side and outer side, and a gas exit pathway;
   b. the vessel is configured such that the vessel inner sides may contain contaminated soil exposed at the top of the vessel and the gas exit pathway is arranged to be at a predetermined location within the contaminated soil such that gases in the contaminated soil may be directed to the gas exit pathway;
   c. a treatment chamber with an opening, a closure for the opening, an incoming air penetration, insulation, and a gas exit pathway penetration, the opening configured such that a treatment vessel may be inserted or removed through the opening when the closure is in the open position, the incoming air penetration configured such that the incoming air is directed external to the treatment vessel when the vessel is located in the treatment chamber, and the treatment chamber gas exit pathway penetration arranged such that treatment air is directed through the soil to the treatment vessel gas exit pathway, then exits the treatment chamber through the penetration;
   d. at least one air dryer and at least one air blower arranged such that the dryer removes moisture from the incoming air to the treatment chamber prior to the blower directing the air from the dryer to the treatment chamber;

e. at least one electric air heater arranged such that the air is heated prior to being directed into the treatment chamber; and f. at least one gas extraction blower arranged such that gases in the gas exit pathway are directed to exit the treatment chamber wherein the dry, heated air directed into the treatment vessel transfers heat to the contaminated soil through the treatment vessel floor, sides, and ends and is directed through the contaminated soil, heating the soil by contact before entering the gas exit pathway and exiting the treatment chamber.

4. The apparatus for thermal desorption of contaminates from a mixture of soil and rocks as in claim 3 further comprising the treatment chamber contains a heat exchanger arranged such that the exhaust of an engine driven electric generator is directed through the heat exchanger providing heat to the chamber.

5. The apparatus for thermal desorption of contaminates from a mixture of soil and rocks as in claim 3 further comprising an exhaust cooling system cooler arranged with an exhaust cooling system water injection pipe such that water in the lower portion of the cooler is directed through the pipe to mix with the gases in the gas exit pathway causing cooling of the gases by water vaporization, and the portion of the water not vaporized returned to the cooler with the flow of gases.

6. The apparatus for thermal desorption of contaminates from a mixture of soil and rocks as in claim 3 further comprising an exhaust cooling system cooler arranged with a refrigeration system such that cooling of the exhaust gas is provided by the refrigeration system refrigerant where the cooler is the refrigeration cycle evaporator.

7. An apparatus for heating contaminated soil to remove contaminates comprising:

a. a thermally conductive treatment vessel configured such that the vessel may be filled with contaminated soil exposed at the top of the vessel;

b. a gas exit pathway arranged within the soil in the treatment vessel; and c. a treatment chamber arranged with:
  means for installation of the treatment vessel within the chamber,
  means for heating the chamber interior with dried and heated air,
  means for directing the heated air through the contaminated soil in the treatment vessel,
  means for removing the heated air from the treatment vessel gas exit pathway, and
  means for withdraw of the treatment vessel from within the chamber.

8. The apparatus for heating contaminated soil to remove contaminates as in claim 7 further comprising:

a. means for transport of the treatment vessel from a contaminated soil location; and b. means for transport of the treatment vessel to a soil disposition site.

* * * * *